March 12, 1946. R. H. FULLERTON 2,396,259
LOCK NUT
Filed Aug. 17, 1943

Inventor
ROBERT H. FULLERTON
By C. E. Beach,
Attorney

Patented Mar. 12, 1946

2,396,259

UNITED STATES PATENT OFFICE 2,396,259

LOCK NUT

Robert Henry Fullerton, Binghamton, N. Y., assignor to Charles R. Stewart, Binghamton, N. Y.

Application August 17, 1943, Serial No. 498,934

2 Claims. (Cl. 151—20)

This invention relates to improvements in lock nuts, and more particularly to such nuts as are suited for use as lock-nuts, lock-washers, fasteners, spacers, clips, or the like.

It is an object of this invention to provide nuts, or the like, which can be quickly and conveniently applied over the threaded ends of screws or over corresponding parts of studs or rivets, and such that, when so applied, they will dependably resist disengagement therefrom, even when subjected to vibration.

It is a further object to provide nuts, or the like, of a form such that, when so applied, they will resist rotational movement relative to the surfaces against which they are applied.

With the foregoing objects in view, this invention consists of the novel features of which illustrative forms are hereinafter described, and which are pointed out in the sub-joined claims, and indicated in the annexed drawing, in which:

Figs. 5 and 6 represent modifications to be referred to; and

Figure 1A:
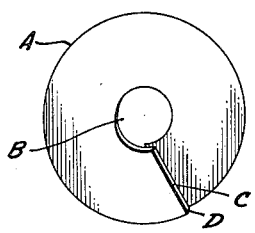
Figure 1a is a top plan view of the lock nut or washer.
Figure 1:
Figure 1 is a side elevation of a lock-nut or washer embodying general features of this invention.
Figure 2:
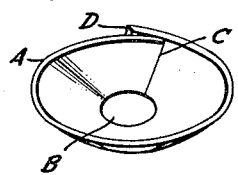
Fig. 2 is a perspective view of the concave side of the nut-washer of Fig. 1.

In Figs. 1 and 2, A represents a cupped lock-nut or washer of thin resilient material and having a central aperture B.

Figure 3:
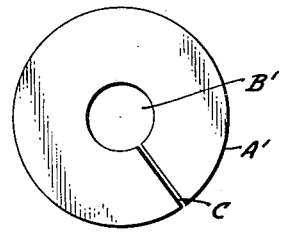
Fig. 3 represents a pierced and slitted disc from which the nut-washer of Figs. 1 and 2 may be formed.
Figure 6:
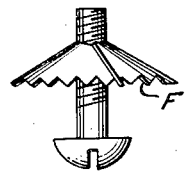

Such nuts or washers may be produced by imparting a cupped formation to flat discs such as the disc A' indicated in Fig. 3; which disc has a substantially central aperture B' pierced therethrough, and is slitted at C from the aperture B' to the edge of said disc. After being so slitted, such a disc might be termed a "strip." Furthermore, instead of utilizing such disc-like strips, strips of more or less rectangular shape may be disposed in the form of washer-like cupped discs, as indicated in Fig. 6; the use of such rectangular strips, instead of disc-like strips, being likely to be specially advantageous when an exceptionally deep cupped formation is needed.

Incidental to effecting the cupped formation of the disc A', above referred to, the portions of said disc adjacent to the slit C therein are brought into overlapping relationship, as indicated in Figs. 1 and 2, with resultant decrease in the size of the opening B'.

After being thus decreased, such opening should be appreciably smaller than any screw, rivet or stud upon which it is intended that the nut or washer should be secured. Because of the resiliency of the material, a given nut or washer will be suitable for application to studs of any one of several sizes.

It should be understood that the word "stud" as hereinafter used, is intended to include any projecting part, whether of a screw, bolt, rivet or other object, and which (unless otherwise expressly stated) may or may not be threaded.

The relationship of the overlapping portions of discs intended for mounting upon the threaded portions of intended screws or studs should be that which will facilitate their conformity to the pitch of such threads; and discs intended for such mounting should be of material sufficiently thin so that such walls will readily so conform and will be suitable for entering spaces between such threads.

As best indicated in Fig. 1, a corner D of a wall of the slit C projects beyond the general plane of the concave side of the disc A, for engaging the surface to which the disc is to be applied, for the purpose of frictionally resisting rotation relative thereto.

Figure 4:
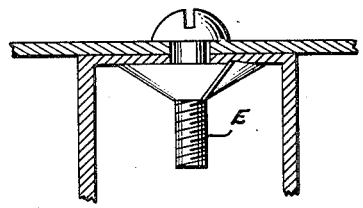
Fig. 4 represents the nut-washer of Figs. 1 and 2 applied in cooperation with a screw serving to attach a channel piece to a plate.
Figure 5:
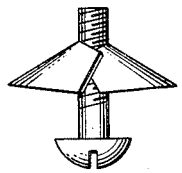

Best results will be obtained if the corner so projecting is the one which will most effectively resist rotation in the direction which will carry the disc along an intended screw thread away from the surface against which it should be clamped. Thus, in the instance of the disc indicated in Fig. 4, the right hand one of the overlapping portions is outermost, and a corner of that portion is shown as having somewhat buried itself in the material of the channel piece E, so as to resist rotation in the direction which should carry the disc away from said channel piece on a screw having a right hand thread. For corresponding positioning with relation to a screw having a left hand thread, the left hand overlapping portion would be outermost, and its corner should project beyond the general plane of the concave side of the disc, and more or less penetrate the surface of the channel piece E.

It will be evident that, under some circumstances, it may be found advantageous to have corners of both walls of the slit correspondingly project, and that such an arrangement may be readily provided.

For uses where it is deemed advantageous that lock-nuts or washers shall firmly grip the material to which they are applied at more than one or two points, sharp points or serrations should be formed in the walls which bound the concave sides thereof, as is indicated at F in Fig. 6.

The overlapping relationship of disc or strip portions adjacent the slit, as contemplated by the foregoing description, serves to increase the effectiveness of the engagement of the edge of the concave side thereof (and of such corner or corners or serrations as may project therefrom) with the material against which they are applied; however, for uses such that the tendency to strip off from screws or studs is comparatively slight, such overlap may be dispensed with; as by providing a wide slit at C.

Figure 7:
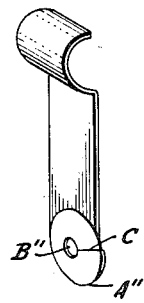
Figs. 7, 8 and 9 are illustrative of methods of applying this invention to various types of clips and fasteners.
Figure 8:
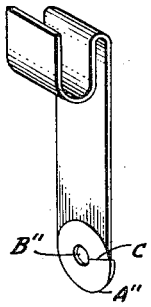
Figure 9:
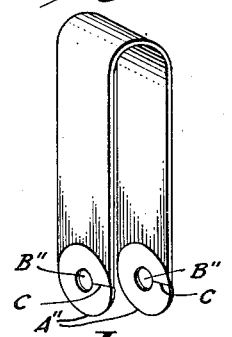

This invention may be utilized for producing friction grip plates such as the clips illustratively indicated in Figs. 7, 8 and 9, by forming therein cupped areas A″ having apertures B″ substantially concentric with such cupped areas, and slitted from edges thereof to said apertures. In the instance of doubled over or U-form locking clips, such cupped areas may be provided in both ends of the clips, as indicated in Fig. 9.

A disc or plate constructed in accordance with this invention may be utilized by placing the concave side thereof against the end of an intended stud, and then pressing against such disc or plate with the fingers or with a hollow punch, and thereby causing it to so expand as to permit the stud to pass therethrough. If desired, additional tightening on threaded surfaces may be effected, as by rotating the screw, or by rotating the disc or plate relative to the threaded surface of the stud.

In any event, flattening of any disc or of the cupped area of any plate such as may result from application thereof to an intended stud or from subsequent rotational tightening, will tend to urge decrease in the size of the aperture therethrough, and thus serve to cause it to more firmly grip the stud.

I claim:

1. A lock nut of a strip of resilient sheet metal of cone shape, the ends overlapping so that the inner edge forms a helix to engage the screw threads of a threaded member and the corner of the overlapping end projecting beyond the plane of the base.

2. A lock nut as described in claim 1 in which the locking element is a serrated edge on the base of the nut.

ROBERT H. FULLERTON.